United States Patent Office 3,337,564
Patented Aug. 22, 1967

3,337,564
SULFOBETAINES AND PROCESS FOR THE PREPARATION THEREOF
Wolf-Dieter Willmund, Dusseldorf-Holthausen, Germany, assignor to Dehydag Deutsche Hydrierwerke G.m.b.H., Dusseldorf, Germany, a corporation of Germany
No Drawing. Filed Mar. 31, 1964, Ser. No. 356,049
Claims priority, application Germany, May 8, 1963, D 41,506
6 Claims. (Cl. 260—294.8)

This invention relates to new sulfobetaines and to a process for their preparation.

It has been found that the reaction of tertiary aliphatic, aromatic or aliphatic-aromatic amine oxides with sultones (inner esters of hydroxyalkane-sulfonic acids) leads to heretofore unknown sulfobetaines of the general formula

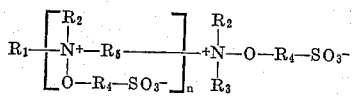

In this formula $R_1$, $R_2$ and $R_3$ represent aliphatic, cycloaliphatic or aromatic radicals or mixed radicals of this type, which may also be substituted or interrupted by heteroatoms or heteroatom groups, or may form, together with the nitrogen atom, a heterocyclic ring system, such as pyridine or piperidine. At least one of these radicals may be of high-molecular weight, i.e., may comprise 8 to 18 carbon atoms. $R_4$ and $R_5$ represent a bivalent aliphatic or aliphatic-aromatic hydrocarbon radical which may be substituted. The letter $n$ is an integer from 0 to 3.

When $n$ equals 0, the simplest form of compound is formed with the formula

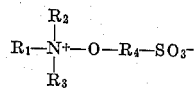

where the $R_1$, $R_2$, $R_3$ and $R_4$ have meanings as above defined.

The formation of the reaction products thus formed was surprising inasmuch as amine oxides at elevated temperatures (about 100° C.) relatively easily re-arrange into the corresponding O-alkyl derivatives of the N,N-disubstituted hydroxylamine

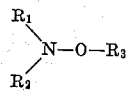

which would be expected to form compounds of the general formula

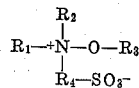

upon reaction with sultones. However, it turned out that upon decomposition of the sulfobetaines of the invention in the presence of alkaline agents, such as upon addition of sodium hydroxide, a tertiary amine and an aldehyde-alkane-sulfonic acid corresponding to the sultone in the form of its sodium salt is formed, which points toward the indicated structure of the sulfobetaines according to the present invention.

Examples of amine oxides which are suitable as starting materials include the following: hexyl-, octyl-, dodecyl-, tetradecyl-, hexadecyl-, octadecyl-dimethyl- or -diethylamine oxides, phenyl-dimethylamine oxide, benzyl-dibutylamine oxide, p-dodecylphenyl-dimethylamine oxide, butyl-dicyclohexylamine oxide, triethylamine oxide and octyl-di-(hydroxyethyl)-amine oxide, and oxides of tertiary polyalkylene polyamines, such as permethylated ethylene diamine, diethylene triamine, and derivatives thereof.

Examples of sultones suitable for the reaction are propanesultone, butanesultone, tolylsultone, as well as higher sultones, such as the reaction product of n-tridecene-1 and sulfur trioxide, which may be obtained, for example, according to copending, commonly-assigned United States Patent No. 3,164,609.

The reaction of the starting materials is advantageously performed in organic solvents, such as chlorinated hydrocarbons, alcohol, acetone or also water, and leads to very good yields. However, the starting materials may also be reacted with each other in the molten state, provided this is possible at temperatures which exclude a decomposition or re-arrangement of the components. When performed in the presence of a solvent, the reaction is generally carried out at temperatures of 15° to 80° C., and when performed in the molten state at about 100° C., or from 50 to 150° C.

The novel products obtained according to the present invention have manifold utilities. If one of the nitrogen substituents is a high-molecular-weight hydrocarbon radical of more than 8 carbon atoms, the compounds by virtue of their structure have the character of tensids and are suitable for purposes where surfactive agents are customarily used. They exhibit excellent washing properties. They are further useful as wetting agents, for instance in electroplating baths. Sulfobetaines according to the invention which comprise only short-chain radicals ($R_1$, $R_2$, $R_3$=$C_1$-$C_6$) possess brightening properties when used as additives in electroplating processes.

The following specific examples are presented to illustrate the invention and to enable persons skilled in the art to better understand and practice the invention and are not intended to be limitative.

*Example I*

10.3 gm. of pyridine oxide were dissolved in 30 cc. of ethanol, and the solution was rapidly admixed at 50° C. with a solution of 13.3 gm. of propane sultone in 20 cc. of ethanol. Thereafter, the mixture was heated rapidly to the boiling point and was then stirred for 5 minutes under reflux. Upon slow cooling, crystallization began after a few minutes, which was accelerated by cooling in ice. The compound which had crystallized out, namely, pyridinium-oxypropane sulfobetaine, was separated by vacuum filtration, washed with ethanol and dried in vacuo. The yield was 12.8 gm. The product had a melting point of 194.5 to 195° C. By concentrating the filtrate and grinding the residue under acetone 6.8 gm. of additional end product, and from the mother liquor 3.7 gm. more of the product were obtained. Thus, the total yield was 23.8 gm.=98.8% of theory.

Analytical data $C_8H_{11}NO_4S$ (molecular weight=217). Found: C, 44.37; H, 5.38; N, 6.21; S, 14.87; O, 29.17; $H_2O$, 0; Hydroxyl No. 0. Calculated: C, 44.25; H, 5.07; N, 6.45; S, 14.74; O, 29.50; $H_2O$, 0; Hydroxyl No., 0.

The same product was also obtained by reacting the starting materials in the molten state. For this purpose 1.9 gm. of pyridine oxide and 2.44 gm. of propane sultone were admixed, and the mixture was melted on a steam bath. After 30 seconds an exothermic reaction suddenly occurred in the clear melt, in the course of which the melt solidified into a crystalline mass. After heating the mass for an additional 5 minutes on the steam bath, it was recrystallized from ethanol. The yield was 2.9 gm. of pyridinium-oxypropane sulfobetaine (67% of theory) having a melting point of 193.5° C. One additional gram of sulfobetaine was recovered from the filtrate, so that the total yield was 90% of theory.

Example II 50.3 gm. of dimethyldodecylamine oxide (obtained by reacting for about 5 hours 105 ml. of 6% hydrogen peroxide with 39.4 gm. of dimethyldodecylamine in 150 cc. of ethanol at 75° to 80° C., evaporating the solution and drying the residue) were dissolved in 100 cc. of absolute ethanol, and then 22.6 gm. of molten propanesultone were added dropwise at 60° C., the mixture was stirred under reflux for 2 hours, the reaction mixture was evaporated and dried in vacuo at 80° C. 67.9 gm. of raw product were obtained. The raw product was treated with warm acetone, the solid substance was separated by vacuum filtration and dried. 22.2 gm. of dimethyldodecyl ammonium oxypropane sulfobetaine having a melting point of 169° to 170° C. (a) were obtained. By evaporating the filtrate and drying the residue 42.5 gm. of additional solid substance (b) were obtained, making a total yield of 64.7 gm.=98.5% of theory.

Analysis of substances (a) and (b):

|  | Found | | Calculated |
|---|---|---|---|
|  | (a) | (b) |  |
| $C_{17}H_{37}NO_4S$ (mol. wt.=351): |  |  |  |
| C | 58.78 | 56.04 | 58.18 |
| H | 10.53 | 10.14 | 10.54 |
| O | 18.39 | 20.66 | 18.23 |

The following variation of the product was found to be particularly advantageous:

125.6 gm. of dimethyldodecylamine oxide (the raw product of the reaction between 106.5 gm. of dimethyldodecylamine in 600 cc. of acetone with 42.5 cc. of 40% hydrogen peroxide in 100 cc. of acetone) were taken up in 500 cc. of acetone, and 61 gm. of molten propanesultone were added dropwise over a period of 20 minutes while refluxing the acetone solution. The reaction product precipitated in the form of fine crystalline leaflets. The reaction mixture was stirred for 2½ hours more under reflux, the precipitated substance was separated by vacuum filtration at room temperature, the filter cake was washed twice with acetone and was then dried at 50° C. in vacuo. 113.4 gm. of dimethyldodecyl ammonium oxypropane sulfobetaine having a melting point of 172° C. were obtained, which corresponds to a yield of 59% of theory.

C, 58.30 (58.18); H, 10.51 (10.54).

Under the conditions indicated in Examples I and II the following additional compounds having the general formula

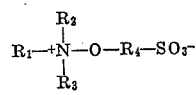

were prepared:

| | $R_1$ | $R_2$ | $R_3$ | $R_4$ | M.P., °C. |
|---|---|---|---|---|---|
| 1 | $C_8H_{17}$ | $CH_3$ | $CH_3$ | $(CH_2)_3$ | |
| 2 | $C_{10}H_{21}$ | $CH_3$ | $CH_3$ | $(CH_2)_3$ | |
| 3 | $C_{12}H_{25}$ | $CH_3$ | $CH_3$ | $(CH_2)_3$ | 172 |
| 4 | $C_{14}H_{29}$ | $CH_3$ | $CH_3$ | $(CH_2)_3$ | 174 |
| 5 | $C_{16}H_{33}$ | $CH_3$ | $CH_3$ | $(CH_2)_3$ | 175.5 |
| 6 | $C_{18}H_{37}$ | $CH_3$ | $CH_3$ | $(CH_2)_3$ | 178 |
| 7 | Coconut-alkyl mixture $C_{12}-C_{18}$. | $CH_3$ | $CH_3$ | $(CH_2)_3$ | Liquid |
| 8 | $C_8H_{17}$ | $CH_2CH_2OH$ | $CH_2CH_2OH$ | $(CH_2)_3$ | (1) |
| 9 | $C_{12}H_{25}$ | $CH_2CH_2OH$ | $CH_2CH_2OH$ | $(CH_2)_3$ | (1) |
| 10 | $C_{12}H_{25}O(CH_2)_3$ | $CH_3$ | $CH_3$ | $(CH_2)_3$ | 157-159 |
| 11 | $C_{11}H_{23}CONH(CH_2)_3-$ | $CH_3$ | $CH_3$ | $(CH_2)_3$ | |
| 12 | $C_{12}H_{25}CONH(CH_2)_3-$ | $CH_3$ | $CH_3$ | $(CH_2)_3$ | |
| 13 | $C_{12}H_{25}-\text{C}_6\text{H}_4-CH_2-$ | $CH_3$ | $CH_3$ | $(CH_2)_3$ | Viscous |
| 14 | $\text{C}_6\text{H}_5-CH_2$ | $CH_3$ | $CH_3$ | $(CH_2)_3$ | 174 |
| 15 | $C_6H_{11}$ | $CH_3$ | $CH_3$ | $(CH_2)_3$ | 155 |
| 16 | $C_2H_5$ | $C_2H_5$ | $C_2H_5$ | $(CH_2)_3$ | 121 |
| 17 | $HOCH_2CH_2-$ | $HOCH_2CH_2-$ | $CH_3$ | $(CH_2)_3$ | |
| 18 | $\text{C}_6\text{H}_5-$ | $CH_3$ | $CH_3$ | $(CH_2)_3$ | |
| 19 | $C_2H_{25}$ | $CH_3$ | $CH_3$ | $(CH_2)_4$ | |
| 20 | $R_1 + R_2 + R_3 + N$: pyridinium | | | $(CH_2)_3$ | 194.5-195 |
| 21 | $R_1 + R_2 + R_3 + N$: quinolinium | | | $(CH_2)_3$ | 182 |
| 22 | $R_1 + R_2 + N$: piperidinium | | $C_{12}H_{25}-\text{C}_6\text{H}_4-CH^\epsilon$ | $(CH_2)_3$ | |
| 23 | $R_1 + R_2 + R_3 + N$: pyridinium | | | $-CH_2-CH(C_{11}H_{23})-$ | 149 |
| 24 | $C_{12}H_{25}$ | $CH_3$ | $CH_3$ | $-CH_2-\text{C}_6\text{H}_5$ | 42-43 |

[1] Solid, but not crystalline.

By the same process viscous products with several sulfobetaine groups were obtained when the starting materials with several tertiary amine oxide groups in the molecule were reacted with sultones. These products have the formula

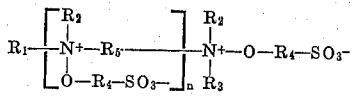

where $n$ is at least 1 and $R_1$, $R_2$, $R_3$, $R_4$ and $R_5$ are as previously defined. The products are as follows:

25.
$$-O_3S-(CH_2)_3-O-\overset{+}{N}(CH_3)_2-CH_2CH_2-\overset{+}{N}(CH_3)_2-O-(CH_2)_3-SO_3^-$$

26.
$$-O_3S-(CH_2)_3-O-\overset{+}{N}(CH_2CH_2OH)_2-CH_2CH_2-\overset{+}{N}(CH_2CH_2OH)_2-O-(CH_2)_3-SO_3^-$$

27.
$$-O_3S-(CH_2)_3-O-\overset{+}{N}(C_2H_5)_2-CH_2CH(OH)-CH_2-\overset{+}{N}(C_2H_5)_2-O-(CH_2)_3-SO_3^-$$

28.
$$-O_3S(CH_2)_3-O-\overset{+}{N}(CH_3)_2-CH_2CH_2-\overset{+}{N}(CH_3)(O(CH_2)_3SO_3^-)-CH_2CH_2-\overset{+}{N}(CH_3)_2-O-(CH_2)_3-SO_3^-$$

29.
$$-O_3S-(CH_2)_3-O-\overset{+}{N}(CH_2CH_2OH)_2-CH_2CH_2-\overset{+}{N}(CH_2CH_2OH)(O(CH_2)_3SO_3^-)-CH_2CH_2-\overset{+}{N}(CH_2CH_2OH)_2-O-(CH_2)_3-SO_3^-$$

While certain specific examples and preferred modes of practice of the invention have been set forth it will be understood that this is solely for the purpose of illustration and that various changes and modifications may be made without departing from the spirit of the disclosure and the scope of the appended claims.

I claim:

1. A sulfobetaine selected from the group consisting of (1) compounds of the formula

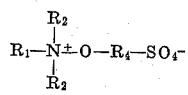

and (2) compounds of the formula

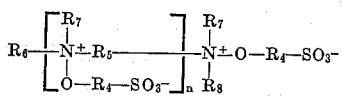

wherein $R_1$, $R_2$ and $R_3$ are members selected from the group consisting of alkyl having from 1 to 18 carbon atoms, phenyl, phenylalkyl having from 1 to 12 carbon atoms in the alkyl, alkylphenyl having from 1 to 12 carbon atoms in the alkyl, alkylphenylalkyl having from 1 to 12 carbon atoms in the alkyls, cyclohexyl, hydroxyalkyl having from 1 to 18 carbon atoms, alkoxyalkyl having from 2 to 18 carbon atoms, alkylcarbonylaminoalkyl having from 2 to 18 carbon atoms; $R_1$ and $R_2$ taken together are alkylene having 5 carbon atoms; and $R_1$, $R_2$ and $R_3$ taken together with the nitrogen atom are pyridino and quinolino; $R_4$ is a member selected from the group consisting of alkylene having from 3 to 13 carbon atoms and toluylene; $R_6$, $R_7$ and $R_8$ are members selected from the group consisting of methyl, ethyl and hydroxyethyl; $R_5$ is selected from the group consisting of ethylene and hydroxypropylene; and $n$ is an integer from 1 to 3.

2. The compound of claim 1 wherein at least one of $R_1$, $R_2$ and $R_3$ has at least 8 carbon atoms.

3. The compound of claim 1 wherein $R_1$, $R_2$ and $R_3$ have from 1 to 6 carbon atoms.

4. Pyridinium-oxy-propane sulfobetaine.

5. The process for the production of a sulfobetaine of claim 1 which comprises the steps of reacting an amine oxide selected from the group consisting of (1) compounds of the formula

and (2) compounds of the formula

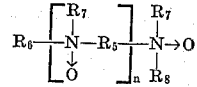

wherein $R_1$, $R_2$ and $R_3$ are members selected from the group consisting of alkyl having from 1 to 18 carbon atoms, phenyl, phenylalkyl having from 1 to 12 carbon atoms in the alkyl, alkylphenyl having from 1 to 12 carbon atoms in the alkyl, alkylphenylalkyl having from 1 to 12 carbon atoms in the alkyls, cyclohexyl, hydroxyalkyl having from 1 to 18 carbon atoms, alkoxyalkyl having from 2 to 18 carbon atoms, alkylcarbonylaminoalkyl having from 2 to 18 carbon atoms; $R_1$ and $R_2$ taken together are alkylene having 5 carbon atoms; and $R_1$, $R_2$ and $R_3$ taken together with the nitrogen atom are pyridino and quinolino; $R_6$, $R_7$ and $R_8$ are members selected from the group consisting of methyl, ethyl and hydroxyethyl; $R_5$ is selected from the group consisting of ethylene and hydroxypropylene; and $n$ is an integer from 1 to 3; with a sultone of the formula

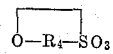

wherein $R_4$ is a member selected from the group consisting of alkylene having from 3 to 13 carbon atoms and toluylene, at a temperature of from 15° C. to 80° C. in the presence of a solvent selected from the group consisting of water, inert organic solvents and mixtures thereof; and recovering said sulfobetaine.

6. The process for the production of a sulfobetaine of claim 1 which comprises the steps of reacting an amine oxide selected from the group consisting of (1) compounds of the formula

and (2) compounds of the formula

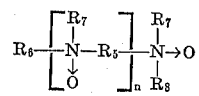

wherein $R_1$, $R_2$ and $R_3$ are members selected from the group consisting of alkyl having from 1 to 18 carbon atoms, phenyl, phenylalkyl having from 1 to 12 carbon atoms in the alkyl, alkylphenyl having from 1 to 12 carbon atoms in the alkyl, alkylphenylalkyl having from 1 to 12 carbon atoms in the alkyls, cyclohexyl, hydroxyalkyl having from 1 to 18 carbon atoms, alkoxyalkyl having from 2 to 18 carbon atoms, alkylcarbonylaminoalkyl having from 2 to 18 carbon atoms; $R_1$ and $R_2$ taken together are alkylene having 5 carbon atoms; and $R_1$, $R_2$ and $R_3$ taken together with the nitrogen atom are pyridino and quinolino; $R_6$, $R_7$ and $R_8$ are members selected from the group consisting of methyl, ethyl and hydroxyethyl; $R_5$ is selected from the group consisting of ethylene and hydroxypropylene; and $n$ is an integer from 1 to 3; with a sultone of the formula

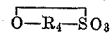

wherein $R_4$ is a member selected from the group consisting of alkylene having from 3 to 13 carbon atoms and toluylene, at a temperature between the melting temperature of the reactants and 150° C., in the presence of a solvent selected from the group consisting of water, inert organic solvents and mixtures thereof; and recovering said sulfobetaine.

References Cited

UNITED STATES PATENTS

| | | | |
|---|---|---|---|
| 2,359,864 | 10/1944 | Linch | 260—286 |
| 2,995,562 | 8/1961 | Ames et al. | 260—290 X |
| 3,109,846 | 11/1963 | Klass et al. | 260—286 |
| 3,131,189 | 4/1964 | Klass et al. | 260—279 |
| 3,164,608 | 1/1965 | Blaser | 260—327 |
| 3,200,127 | 8/1965 | Klass et al. | 260—294.8 |
| 3,235,549 | 2/1966 | Broussalian. | |

ALEX MAZEL, *Primary Examiner.*

D. G. DAUS, *Assistant Examiner.*